US012559647B2

(12) United States Patent
Jordan, IV et al.

(10) Patent No.: US 12,559,647 B2
(45) Date of Patent: Feb. 24, 2026

(54) WOOD WITH STRENGTHENING COATING

(71) Applicant: Tough by Nature, LLC, Mount Gilead, NC (US)

(72) Inventors: Robert B. Jordan, IV, Mount Gilead, NC (US); Ryan Hilsinger, Climax, NC (US); Ivan Hurlburt, Houston, TX (US)

(73) Assignee: Tough By Nature, LLC, Mt. Gilead, NC (US)

( * ) Notice: Subject to any disclaimer, the term of this patent is extended or adjusted under 35 U.S.C. 154(b) by 842 days.

(21) Appl. No.: 17/408,754

(22) Filed: Aug. 23, 2021

(65) Prior Publication Data

US 2022/0064477 A1 Mar. 3, 2022

Related U.S. Application Data

(60) Provisional application No. 63/152,901, filed on Feb. 24, 2021, provisional application No. 63/138,865, filed on Jan. 19, 2021, provisional application No. 63/071,853, filed on Aug. 28, 2020.

(51) Int. Cl.
| | |
|---|---|
| *C09D 175/04* | (2006.01) |
| *B05D 7/06* | (2006.01) |
| *B65D 19/00* | (2006.01) |
| *E01B 3/10* | (2006.01) |
| *E04C 2/24* | (2006.01) |
| *E04C 3/17* | (2006.01) |

(52) U.S. Cl.
CPC ............. *C09D 175/04* (2013.01); *B05D 7/06* (2013.01); *B65D 19/0095* (2013.01); *E01B 3/10* (2013.01); *E04C 2/24* (2013.01); *E04C*

*3/17* (2013.01); *B65D 2519/00029* (2013.01); *B65D 2519/00044* (2013.01); *B65D 2519/00064* (2013.01); *B65D 2519/00079* (2013.01)

(58) Field of Classification Search
None
See application file for complete search history.

(56) References Cited

U.S. PATENT DOCUMENTS

| | | | |
|---|---|---|---|
| 4,267,299 | A | 5/1981 | Oechsle, III |
| 4,786,657 | A | 11/1988 | Hammar et al. |
| 6,825,268 | B2 | 11/2004 | Maier et al. |
| 10,119,034 | B2 | 11/2018 | Lu |
| 2006/0100340 | A1 | 5/2006 | Gao et al. |

(Continued)

FOREIGN PATENT DOCUMENTS

GB 2489701 A * 10/2012 ......... B65D 19/0095

OTHER PUBLICATIONS

"Elastothan Polymer Coating Technologies" brochure, Elastothane Ltd. (2017).

(Continued)

*Primary Examiner* — Chinessa T. Golden
(74) *Attorney, Agent, or Firm* — MacCord Mason PLLC

(57) ABSTRACT

An enhanced wood product includes a wooden board or plank having a length and at least three sides, the sides defining a polygonal cross section along the length of the wooden board or plank. A polyurethane-urea coating on at least two of the sides very substantially increases the strength of the wood product and various products made with coated wood.

9 Claims, 5 Drawing Sheets

(56) References Cited

U.S. PATENT DOCUMENTS

| | | | |
|---|---|---|---|
| 2006/0179733 A1* | 8/2006 | Padmanabhan ....... | E04F 15/048 |
| | | | 52/177 |
| 2011/0113721 A1* | 5/2011 | Hak ...................... | B27M 1/003 |
| | | | 52/741.3 |
| 2011/0195245 A1 | 8/2011 | Himmelwright et al. | |

OTHER PUBLICATIONS

"Southern Pine Design Value Forum: A Review of the Margin of Safety of In-Market Lumber" Atlanta, Georgia (2011).
"Update on Southern Pine Design Values" Southern Pine Inspection Bureau, SPIB Technical Committee (2018).
"Southern Pine Reference Design Values" Southern Forest Products Association, Southern Pine Use Guide, 2013 Edition.
"Cross-laminated_timber" Wikipedia, accessed Feb. 23, 2021.

* cited by examiner

WOOD WITH STRENGTHENING COATING

BACKGROUND OF THE INVENTION

Wood has been used for centuries in building structures, as well as other uses. The benefits of wood are numerous, but it also has drawbacks. Wood can be damaged by impact or excessive compression. It is also subject to attack by moisture promoting mildew and other decay, and insects. One of the leading species for construction lumber is Southern Yellow Pine. Southern yellow pine grows quickly and so is available for relatively inexpensive use in construction. However Southern Yellow Pine is relatively soft and subject to the potential drawbacks outlined above. Other species also suffer from those drawbacks.

SUMMARY OF THE INVENTION

The present invention fulfills one or more of these needs in the art by providing an improved wood product that includes a wooden board or plank having a length and at least three sides. The sides define a polygonal cross section along the length of the wooden board or plank. A polyurethane-urea coating is on at least two of the sides. The coating may be an elastomeric polyurethane-urea hybrid coating.

Typically, the sides define a polygon having four sides and the polyurethane-urea coating is on sides that are parallel to each other. The polyurethane-urea coating may be on all four sides.

The coating may be between 20-40 mils thick, preferably between 25-35 mils thick, most preferably about 30 mils thick. The wood may be Southern Yellow Pine. The wood performs best if it has not more than 19% moisture content. The wood may have been dried in a continuous kiln.

The wooden board or plank may have grooves formed on one side with the coating covering the grooves but leaving a remaining groove.

In one use, a roof truss includes wooden chords, including a bottom chord, webs, and top chords, wherein the bottom chord has a top face and a bottom face. The top face and bottom face (and potentially other faces) have the polyurethane-urea coating.

The invention can also be considered as a method of increasing the strength of a wood product including providing a wooden board or plank having at least three sides and coating a polyurethane-urea coating on at least two of the sides of the wooden board or plank. The method may include passing the wooden board or plank through a continuous kiln to reduce moisture content in the wooden board or plank to not more than 19%. Coating preferably includes spraying precursors of the coating on the board or plank to achieve a coating thickness of between 20 and 40 mils.

The invention can also be considered as a coated wood product that has a wooden core and a polyurethane-urea coating completely surrounding the core, the coated wood product increasing in weight by less than 1% after complete submersion in water for 48 hours.

The invention can also be considered as a lumber stack having alternating layers of dimensional lumber and sticks, at least some of the sticks comprising a wooden core and a polyurethane-urea coating completely surrounding the core.

The invention can also be considered as a shipping pallet. The pallet has top and bottom layers of deck boards and blocks/runners between the layers of deck boards, and the deck boards joined to the blocks/runners by brads or nails. A coating of polyurethane-urea entirely coats the top and bottom layers of deck boards and the brads and/or nails.

The invention can also be considered as a railroad tie for a railroad installation of conventional engineering. The tie includes a wood core having a length and width about the same as a tie that would be used in the railroad installation of conventional engineering and a thickness of about one-half the thickness of a tie that would be used in the railroad installation of conventional engineering, and a polyurethane-urea coating surrounding the wood core. The wood core is preferably free of conventional preservative chemicals.

BRIEF DESCRIPTION OF THE DRAWINGS

The invention will be better understood by a reading of the Detailed Description of the Examples of the Invention along with a review of the drawings, in which.

DETAILED DESCRIPTION

Figure 1:
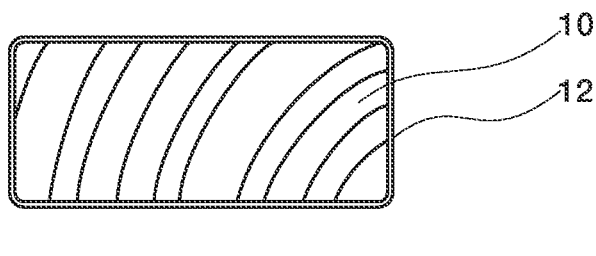
FIG. 1 is a sectional view of a standard two-by-four coated with the polyurethane-urea hybrid coating disclosed herein.

The figures show an elastomeric polyurethane-urea hybrid coating over a wooden core. The polyurethane-urea-hybrid coating can be applied over a wooden core as in a plank (board), but other wood surfaces can also be treated. The polyurethane-urea hybrid coating is applied directly on the wood surface. Best results are obtained if the coating is applied to dry wood with a less than 19% moisture content. One species of wood that is very suitable for this hybrid coating is Southern Yellow Pine and its variants. Particularly preferred is wood that has been dried in a continuous kiln, which provides more uniform drying than a batch kiln.

A suitable coating material is MarvelCoat Premium M91, which is a 100% solids polyurethane-urea hybrid coating. It can be applied in various ways, but a preferred method for volume production is to spray the coating material onto the wood and allow the material to form a gel and cure. It can be sprayed through a dual cartridge spray system or high pressure spray equipment.

Other sources of polyurethane-urea hybrid coatings include INTELLATHANE 7000PV, available from Accella Polyurethane Systems, Maryland Heights, MO 63043 and Elastothane's Elastoline CG POLYUREA HYBRID COATING, available from Elastothane Ltd., Lichfield, WS13 8NT, UK.

One process sprays the material onto the wood from a spray head (gun with nozzle) under pressure by way of a pressure pot or other means or a mechanical device, allowing the hybrid coating to be forced up to the gun or spray nozzle to be sprayed onto the wood.

The elastomeric poly-urea hybrid coating is preferably 30 mils thick, in order to achieve the enhanced strength provided herein. Thinner polyurethane-urea hybrid coatings are not as strong and thicker coatings do not add much strength. However, polyurethane-urea hybrid coating thicknesses in the range of 25-35 mils or 20-40 mils can be used, as well.

Once applied to the wooden core, such as a plank or board or beam, the polyurethane-urea hybrid coating enhances the properties of the plain uncoated wood plank drastically, particularly the strength of the wooden core. The cured polyurethane-urea hybrid coating increases the structural load bearing integrity of the wood in some cases by an order of magnitude.

The elastomeric polyurethane-urea hybrid coating may increase wood strength by a factor of 10, particularly if applied to at least two sides of a square or rectangular cross section wood, like a stud or plank. The two sides are preferably parallel to one another and will be exposed to the greatest shear forces.

Bending/Elasticity/Form Retention are also enhanced. The coated wood products have an increased elasticity that allows products to bend beyond non-coated wood and return to normal shape.

In one informal test of the strength of the coated wood, two standard, dressed 2×4's were positioned end-to-end. Then the elastomeric polyurethane-urea hybrid coating was applied to them to encapsulate the butt joint between the 2×4's. Once the coating had cured, the resulting elongated 2×4 was laid with one end in the bed of a pick-up truck and the other end on the ground. A grown man stood on the elongated 2×4, and the 2×4 did not break, not even at the butt joint.

Additional tests compare the impact and drop resistances of uncoated boards and coated boards. In the impact test, 1×6 inch test boards that were Southern Yellow Pine, 8 feet long (2.54 cm×15.24 cm×2.44 m) were struck by a steel block dropped from a height of 36 inches (0.965 m). The board was examined after each drop, and data was recorded based on any mark or dent made by the block after each impact. "No Mark," "Minimal dent," "Medium dent," and "Large dent" were used to describe the results from each impact. The test results were:

| Test | Uncoated board | Coated board |
|---|---|---|
| 1 | minimal dent | no mark |
| 2 | medium dent | minimal dent |
| 3 | medium dent | no mark |
| 4 | medium dent | no mark |
| 5 | large dent | no mark |
| 6 | minimal dent | minimal dent |
| 7 | large dent | no mark |
| 8 | minimal dent | no mark |
| 9 | medium dent | no mark |
| 10 | medium dent | no mark |
| 11 | large dent | minimal dent |
| 12 | large dent | minimal dent |
| 13 | large dent | no mark |
| 14 | medium dent | no mark |

-continued

| Test | Uncoated board | Coated board |
|---|---|---|
| 15 | minimal dent | no mark |
| 16 | minimal dent | no mark |
| 17 | medium dent | no mark |
| 18 | large dent | minimal dent |
| 19 | medium dent | no mark |
| 20 | medium dent | no mark |

In the drop test, the boards were dropped on their ends from a height of 6 feet (2.438 in). The ends of the board were inspected after each drop, and damage to the end of the board was classified as "split," "crushed end," "chipped," "broken fiber," or "no damage." The following table shows the test results:

| Test | Uncoated board | Coated board |
|---|---|---|
| 1 | crushed end | no damage |
| 2 | chip | no damage |
| 3 | chip | no damage |
| 4 | split | no damage |
| 5 | crushed end | no damage |
| 6 | split | no damage |
| 7 | no damage | no damage |
| 8 | split | no damage |
| 9 | crushed end | no damage |
| 10 | no damage | no damage |
| 11 | split | no damage |
| 12 | split | no damage |
| 13 | split | no damage |
| 14 | chip | no damage |
| 15 | broken fiber | no damage |
| 16 | chip | no damage |
| 17 | split | no damage |
| 18 | split | no damage |
| 19 | broken fiber | no damage |
| 20 | no damage | no damage |

In addition to the dramatic increase in strength, the polyurethane-urea hybrid coating may provide one or more of the following enhancements to the wood core:

The sealed, waterproof coating eliminates or reduces the need for chemical treatment that penetrates the wood itself. The coated board has a lighter weight than the same size of chemically treated boards. Chemically treated boards are quite heavy due to the wet, heavy, nature of the liquid pressure treatment process. The polyurethane-urea hybrid coating can replace creosote, which is used to protect against insects and decay, but which can have harmful effects on humans and the environment. The polyurethane-urea hybrid coating protects the wood from attack by insects or other decaying elements.

The coating can serve as a very effective Water/moisture barrier for wood. Four coated test pieces of wood were completely submerged in water for 24 hours. They showed, respectively, a net weigh gain of 0.21%, 0.56%, 0.65% and 0.32%. After 48 hours of complete submersion, a net weight gain of 0.28%, 0.89%, 0.87% and 0.53% was found. Thus, the net weight gain was less than 1%. It is believed that the coating seals the wood product and does not allow water to enter the wood, creating a waterproof barrier for any coated wood products.

The polyurethane-urea hybrid coating can be applied to provide a gloss finish, a matte finish, or a non-slip textured finish. In addition, the polyurethane-urea hybrid coating can be tinted to any color, including a clear with no coloring or tint.

The polyurethane-urea hybrid coating and the coated wood have a very high durability. The polyurethane-urea hybrid coating has a very high adherence factor to the wood fibers, so the bond of the hybrid coating to the wood core is superior. The polyurethane-urea hybrid coating will not separate if pulled, and the wood will shear or tear elsewhere.

Volatile organic compounds emissions are not released when applying the polyurethane-urea hybrid coating or afterwards.

The coated wood can be nailed, and the polyurethane-urea hybrid coating tends to close around the nail, maintaining the seal. Moreover, if the nail is removed, the polyurethane-urea hybrid coating tends to close over the nail hole. The coated wood can be cut with standard wood sawing equipment. The coating prevents cupping of wooden boards to which it is applied.

FIG. 1 shows a sectional view of a standard two-by-four 10 coated with the polyurethane-urea hybrid coating 12 disclosed herein. As can be seen, the coating adheres to the two-by-four with little to no penetration of the wood itself. The bond of the chemical to the lumber is extremely strong, and applicants have experienced a significant increase in durability of the coated wood products. Drop testing, impact testing, scuff/scrap testing have all proven the coated wood is much more durable than non-coated wood.

Figure 2:
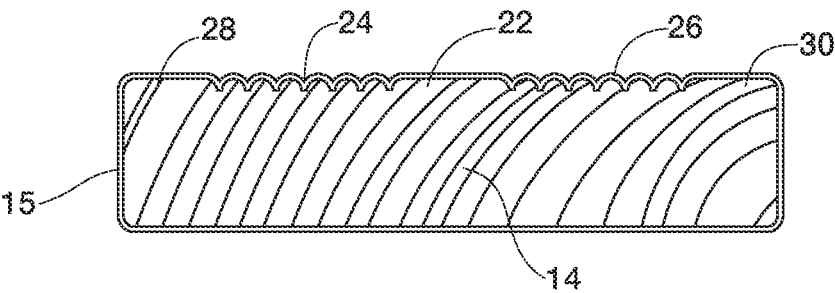
FIG. 2 is a sectional view of a decking plank coated with the polyurethane-urea hybrid coating disclosed herein.
Figure 3:
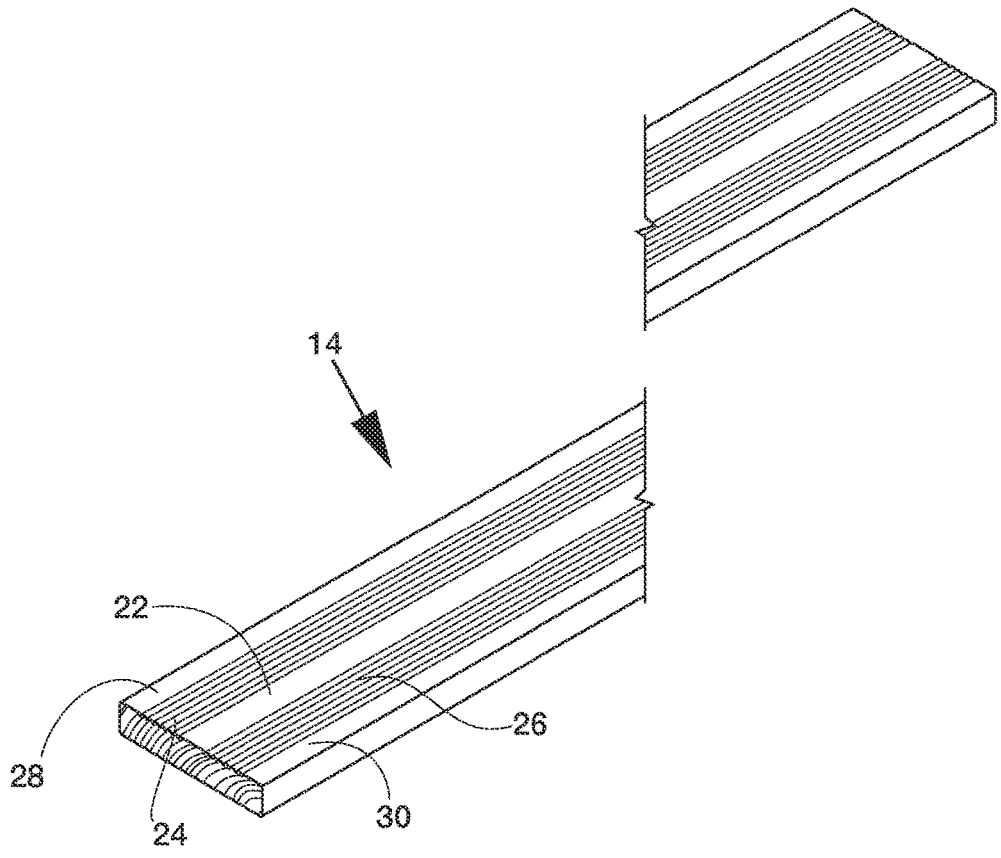
FIG. 3 is a split % view of the plank of FIG. 2.

FIG. 2 shows a sectional view of a decking plank 14 coated with the polyurethane-urea hybrid coating disclosed herein. FIG. 3 is a split % view of the plank of FIG. 2. Before coating, the decking plank 14 has been machined to form a pattern that includes a central flat area 22, first and second sets 24 and 26 of grooves, and outer flat areas 28 and 30. The coating conforms to the pattern, but does not obscure it. The plank can be a JorDeck plank used for decking material and available at Lowe's Home Improvement stores.

Figure 4:
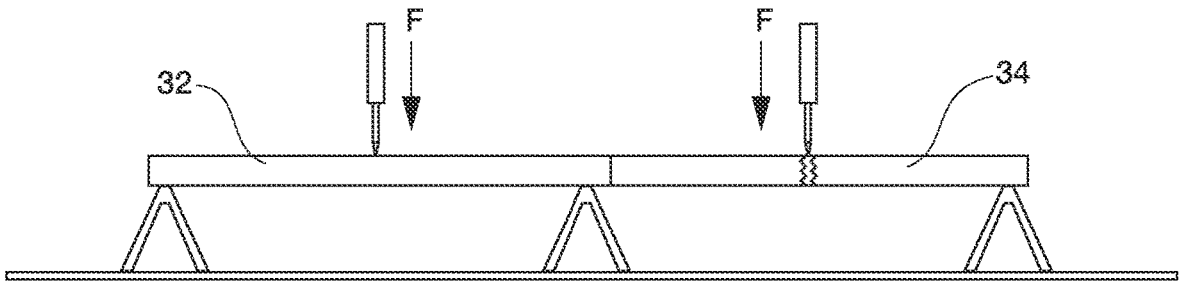
FIG. 4 is a reduced size showing the testing of a plank coated with the polyurethane-urea hybrid coating disclosed herein.

FIG. 4 is a reduced size illustration showing the testing of a 2×4 coated with the polyurethane-urea hybrid coating disclosed herein. The 2×4 portion 32 on the left is coated with the polyurethane-urea hybrid coating, but the portion 34 on the right is untreated. The drawing shows the application the same shearing force F to portion 32 and portion 34. The portion 34 fractures and breaks well before the portion 32.

Figure 5:
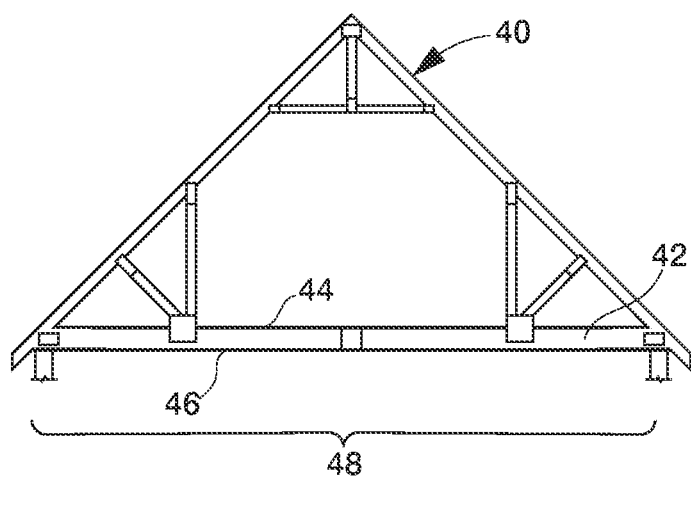
FIG. 5 is a schematic view of a roof truss having its bottom chord strengthened with the polyurethane-urea hybrid coating disclosed herein.
Figure 6:
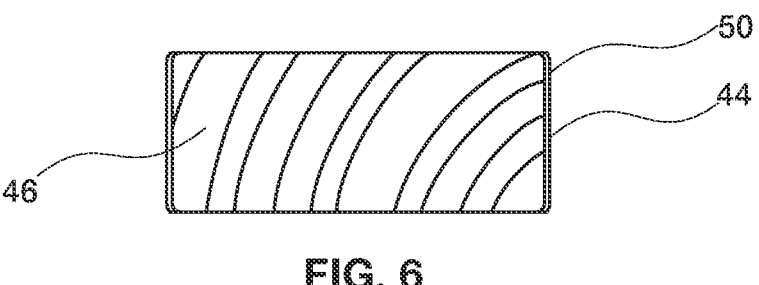
FIG. 6 is an end view of a board having two opposing faces coated with the polyurethane-urea hybrid coating disclosed herein.

The increased strength of coated boards such as 2×4's enables improved construction techniques. FIG. 5 is a schematic view of a roof truss 40 having its bottom chord 42 strengthened with the polyurethane-urea hybrid coating disclosed herein. The coating is applied only to the top 44 and bottom 46 of the chord, but still increases the strength of the chord sufficiently that the length of the span 48 of the truss can be increased over spans that can be safely used for conventional trusses. FIG. 6 is an end view of a board 50 having two opposing faces coated with the polyurethane-urea hybrid coating disclosed herein, similar to the bottom chord of the truss of FIG. 5.

Figure 7:
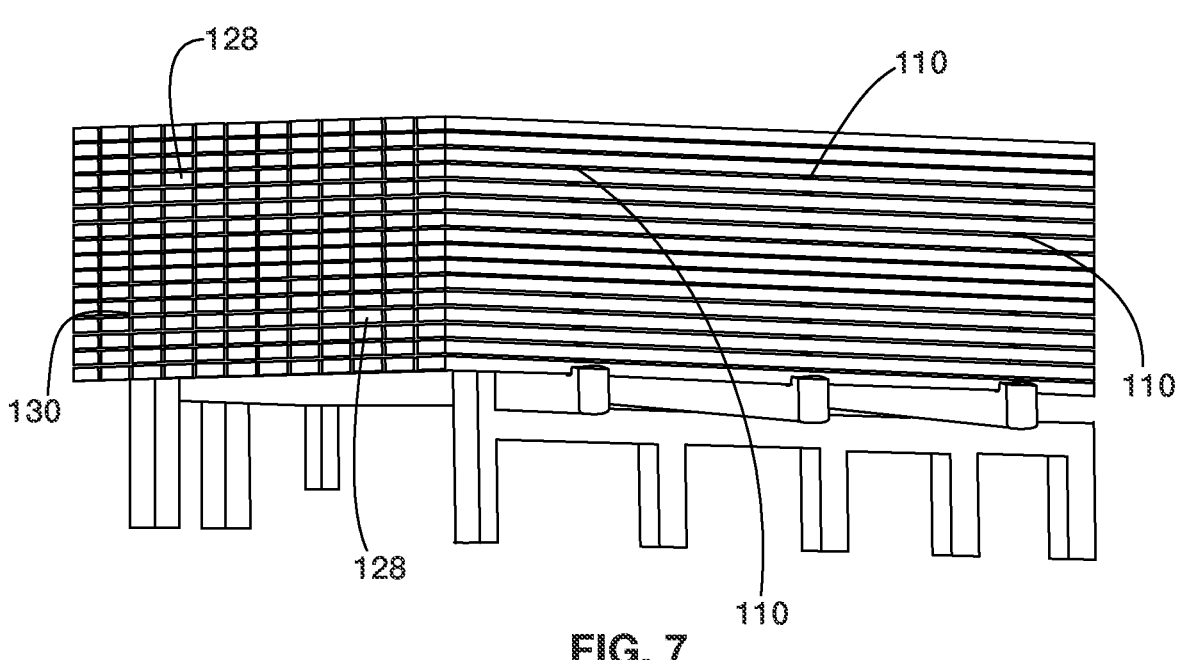
FIG. 7 is a perspective view of a lumber stack using sticks according to an embodiment of the invention.

The coating can also provide protection from high temperatures. This can be very useful in many applications. For example, in the lumber manufacturing process, after lumber is sawn in the sawmill, it is stacked in large units to be dried in a kiln, as seen in FIG. 7. Drying cycles last 50-54 hours, with a temperature range of 220-240 degrees. The lumber being dried 128, 130 in these units are separated by stacking sticks 110 located in between each layer of lumber to increase air flow in the drying process. The sticks are typically 0.75"×1.5"×8,' (1.9×3.8×244 cm) but may be other sizes. The drying process exposes the sticks to prolonged high temperatures (50+ hours at 220-240 degrees Fahrenheit (104 to 115.5 degrees Celsius) as well as green (wet) lumber, steam, and high humidity. After the lumber leaves the drying process, the lumber is removed from the sticks and usually sent to a planer mill. The processes to place the sticks in the units, as well as the process to remove lumber are automated and use mechanical equipment which conventionally continually cause stick breakage, as well as bowing, warping and twisting of the sticks from repeated cycles through the kiln.

Unlike the prior art uncoated sticks, the coated sticks 110 stay straight, bend and give without breaking, and return to their original shape as they move through the entire lumber drying process. Coating the stacking sticks decreases breakage, keeps the sticks straight, and drastically increases the longevity and efficiency of the sticks and the overall drying process.

Figure 8:
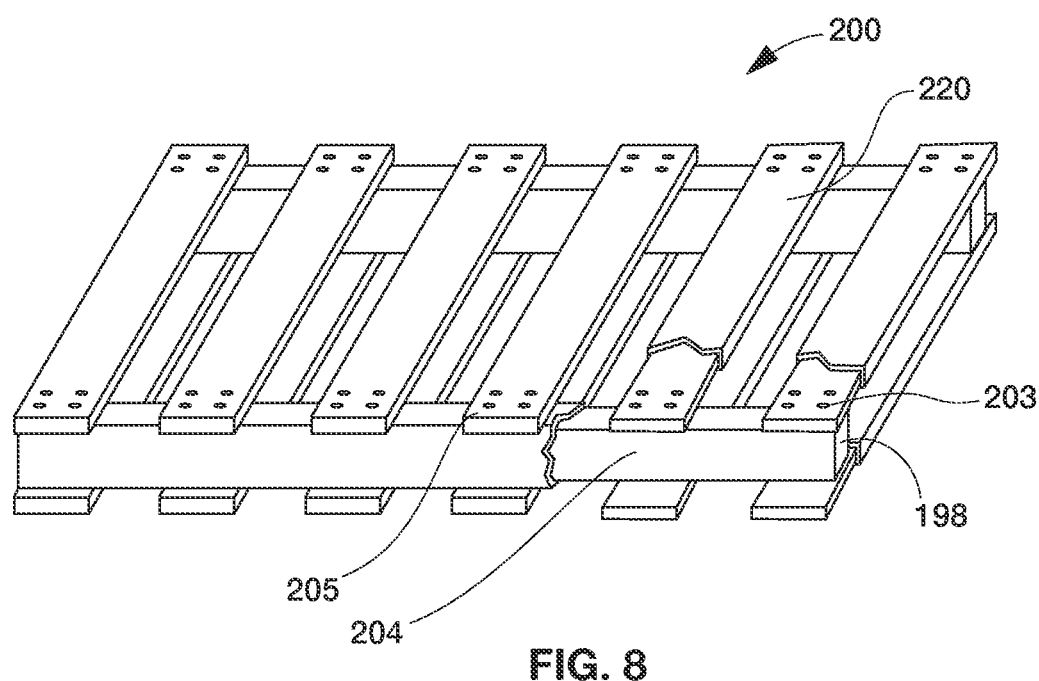
FIG. 8 is a perspective view of pallet coated with the polyurethane-urea hybrid coating disclosed herein, partially cut away to show the wooden core of the pallet.

Another use is to coat shipping pallets. FIG. 8 shows a pallet 200 coated with polyurethane-urea 220, but with a corner of the coating cut-away to reveal the conventional wood pallet 198. Brads or nails 203 are located at connection points to connect top and bottom deck boards 205 to blocks/runners 204. The connection at brads or nails 203 would normally be a weak point. When a conventional uncoated pallet with such a brad or nail connection is under a torsional or twisting force or load, the brads and nails tend to come out, causing the pallet to come apart. If this happens during transport of new products on the pallet, possible damage to the goods on the pallet may result or render the pallet unusable. The polyurethane-urea coating seals the pallet completely, including sealing the brad or nail heads 203 so well that they virtually are unable to back out. This means that if the pallet is subjected to twisting or a torsional load, it is much less likely to come apart so the pallet can be reused, reducing the need for companies to constantly have to replace damaged pallets. The coating also increases the amount of weight the pallet will hold.

Figure 9:
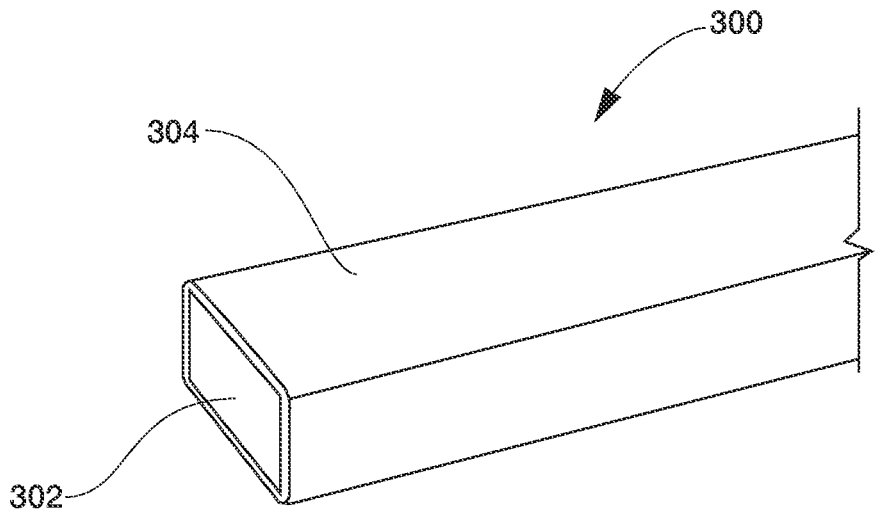
FIG. 9 is a perspective view of a railroad tie, partially in section.

Various Applications of this Hybrid Coated Wood are:
Livestock fencing
Decorative and general fencing
Railroad crossties for the rail industry
Crane mats or Logging mats
Decking
Siding
Playground equipment
Pallets
Doors, windows
Coastal pier building Railroad ties that are made for a railroad installation of conventional engineering are about 9 inches (22.9 cm) wide by 7 to 10 inches (17.8 by 25.4 cm) thick and coated with a preservative such as creosote. Using the coating described herein, railroad ties can be made using much smaller wood timbers, i.e. about half as thick as in a conventional installation. Thus, for the tie 300 seen in FIG. 9, reducing the size of the wood core 302 and using the coating 304 enables about half as much wood to be consumed to make a tie of comparable strength. The coating provides protection against moisture and other environmental attacks.

Figure 10:
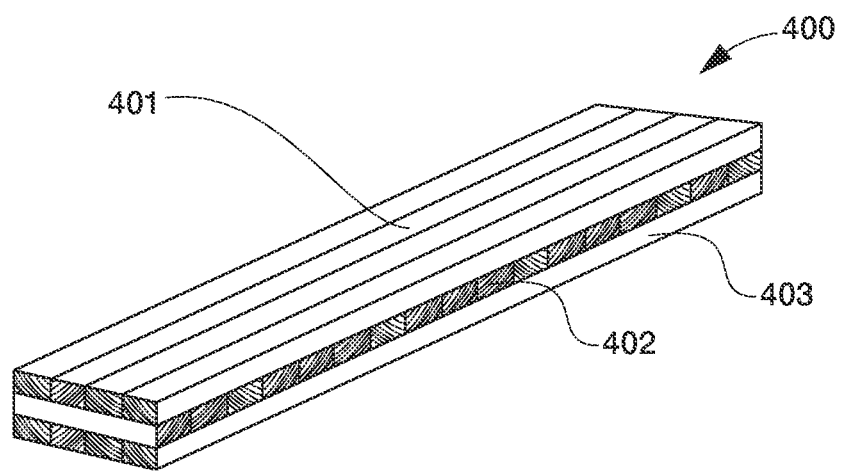
FIG. 10 is a ¾ view of a cross-laminated timber.
Figure 11:
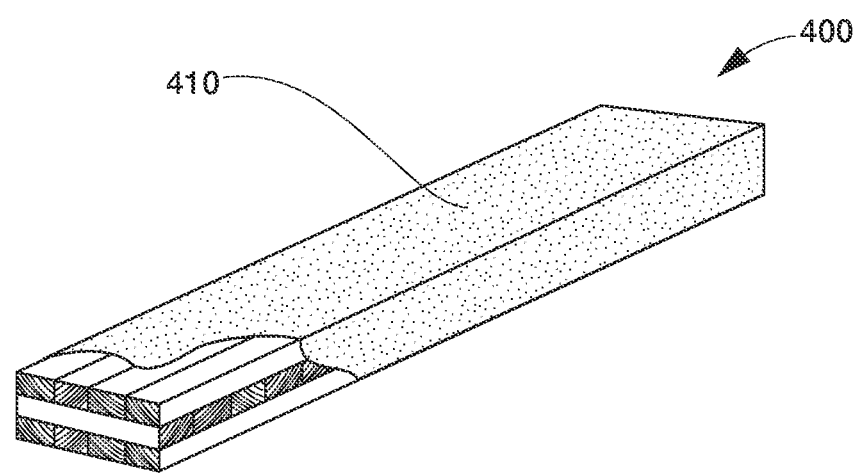
FIG. 11 is a ¾ view of the cross-laminated timber of FIG. 10 coated with the polyurethane-urea hybrid coating partially cut away to show the with the polyurethane-urea hybrid coating disclosed herein, partially cut away to show the wooden core of the pallet.

FIG. 10 shows a 3% view of a cross laminated timber 400 or CLT. The cross laminated timber could be used as a railroad tie. Cross Laminated Timber can be formed with many layers and can be produced in any configuration. FIG. 11 shows a ¾ view with the polyurethane-urea coating on the CLT, with the end shown in a cut away style to show the timbers and the relationship of the CLT unit as it would be made and coated. The coating in production will cover the entire CLT.

The Cross Laminated Timbers are glued together with a marine waterproof glue so as to withstand outdoor environments. Cross laminated timber is similar to Plywood in construction but uses full plank boards glued up in a cross grain configuration. The grain of each layer is perpendicular to the grain of any adjacent layer The example shown in FIGS. 10 and 11 has four boards for layer 401, multiple boards for layer 402 and again four boards for layer 403.

The gluing of boards in the cross grain or cross lamination promotes higher strength than a single wood timber of the same size. This cross lamination process combined with the polyurethane-urea coating 410 as seen in FIG. 11 should produce a product of enormous strength compared to, for example, a standard un-coated single wooden beam or timber.

The boards of Cross Laminated Timbers are usually oriented perpendicular to adjacent layers and glued on each board's wider face tightly with all edges of the boards glued as one unit. The boards are symmetrically oriented so that the outer layers are oriented the same, as we see in layers 401 and 403. An odd number of layers is common as we see here with three layers. Wood is anisotropic and can change its properties depending on environmental conditions so by gluing layers of wood boards at right angles, the panel is able to achieve better structural rigidity in both directions. The polyurethane-urea coating can be applied over a CLT of any shape. The polyurethane-urea coating typically entirely covers the wood core.

The polyurethane-urea coating compound can be used as the glue between layers, but more conventional CLT glues can also be used.

Certain modifications and improvements will occur to those skilled in the art upon reading the foregoing description. It should be understood that all such modifications and improvements have been omitted for the sake of conciseness and readability but are properly within the scope of the following claims.

What is claimed is:
1. An increased durability wood product comprising
a wooden board or plank having a longitudinal length and
    at least three sides, the sides defining a polygonal cross
    section along the length of the wooden board or plank,
    and a polyurethane-urea hybrid external coating directly
    adhered to at least two opposing sides, and said poly-
    urethane-urea hybrid coating comprising 100% elasto-
    meric formulation applied by spraying and cured in
    place and having a thickness between 25 and 35 mils,
    and wherein said polyurethane-urea hybrid coating
    provides a coated board having a structural load bear-
    ing integrity increased by at least a a strength factor of
    10 compared to an untreated board of identical dimen-
    sions when subjected to impact testing, and wherein
    said polyurethane-urea coated wooden board or plank
    is configured to be cut, shaped, or drilled using standard
    wood sawing equipment, wherein said polyurethane-
    urea hybrid coating is self-healing about fastener pen-
    etrations, and wherein said polyurethane-urea hybrid
    coating resists moisture-induced deformations and cup-
    ping, and wherein said polyurethane-urea hybrid coat-
    ing resists moisture absorption such that the coated
    board increases in weight by less than 1% after com-
    plete submersion in water for 48 hours.

2. The wood product as claimed in claim 1 wherein the polyurethane-urea hybrid coating is an elastomeric polyure-thane-urea hybrid coating.

3. The wood product as claimed in claim 1 wherein the sides define a polygon having four sides and the polyure-thane-urea coating is on sides that are parallel to each other.

4. The wood product as claimed in claim 1 wherein the sides define a polygon having four sides and the polyure-thane-urea coating is on all four sides.

5. The wood product as claimed in claim 1 wherein the polyurethane-urea hybrid coating has a thickness of about 30 mils thick.

6. The wood product as claimed in claim 1 wherein the wood comprises Southern Yellow Pine and the polyure-thane-urea hybrid coating has a thickness of about 30 mils.

7. The wood product as claimed in claim 1 wherein the wood has not more than 19% moisture content.

8. The wood product as claimed in claim 7 wherein the wood has been dried in a continuous kiln.

9. The wood product as claimed in claim 1 wherein the wooden board or plank has grooves formed on one side and the coating conforms to the groove profile while leaving a remaining groove exposed after coating.

* * * * *